United States Patent

[11] 3,558,080

| [72] | Inventor | Marcel Kretz<br>Paris, France |
|---|---|---|
| [21] | Appl. No. | 701,765 |
| [22] | Filed | Jan. 30, 1968 |
| [45] | Patented | Jan. 26, 1971 |
| [73] | Assignee | Giravions Dorand<br>Suresnes, France<br>a company of France |
| [32] | Priority | Feb. 23, 1967 |
| [33] | | France |
| [31] | | 96185 |

[54] AEROSPACE VEHICLE
8 Claims, 3 Drawing Figs.

[52] U.S. Cl. .................................................. 244/17.11,
244/1; 416/100
[51] Int. Cl. ..................................................... B64c 27/00
[50] Field of Search ........................................... 244/17.23;
170/160.26; 244/138, 17.17; 244/17.11, 1, 12, 23;
416/100

[56] References Cited
UNITED STATES PATENTS

| 2,328,786 | 9/1943 | Crowder ....................... | 244/17.23X |
| 2,969,211 | 1/1961 | Von Saurma ................. | 244/17.11X |
| 3,339,864 | 9/1967 | Whitson ....................... | 244/1 |

FOREIGN PATENTS

| 1,430,178 | 1/1966 | France .......................... | 244/17.11 |

*Primary Examiner*—Milton Buchler
*Assistant Examiner*—Paul E. Sauberer
*Attorneys*—Robert E. Burns and Emmanuel J. Lobato ABSTRACT: The invention disclosed concerns means for effecting reentry of a space vehicle and it consists basically in providing a casing for the vehicle body, which casing is rotatable relative to the body and has an autogyrating rotor blade system. The body and the casing are controlled for relative angular orientation or the body and casing as an assembly are orientated by controlling such assembly relatively to the blade system.

PATENTED JAN 26 1971 3,558,080

AEROSPACE VEHICLE

SUMMARY OF INVENTION

The present invention relates to an aerospace vehicle and more particularly concerns the heat shielding of such vehicles.

The invention resides in an aerospace vehicle which is characterized by the fact that the body of the vehicle, or the part which houses the crew or load is wholly or partly surrounded by a protective envelope or casing which is rotatable relatively to the said body.

There are various means whereby relative rotation may be caused, for example electromechanical or aerodynamic, inertial or gyroscopic. The invention is only concerned with the rotational means selected, in so far as it allows and provides for rotation of the casing aerodynamically relatively to the body.

The invention in one embodiment further resides in such a vehicle, in which the body is so connected to the casing that it is angularly controllable therein, that is to say that the angle which its axis makes with the axis of the casing is variable under control.

Preferably, the casing is rotatable by reason of its being part of the rotor of an autogyrating rotarywing system, and in one example of the invention the body, wholly or partly surrounded by the casing above referred to, is controllable in its angular relation to the cone of rotation of the rotor system.

The vehicle having an autogyrational rotor system, the hub of the rotor preferably comprises a disclike base with which the casing (preferably a conical structure) is rigid. The body is either controllable as to its angular orientation within the casing, or if angularly rigid with the casing the aerodynamic rotor system is controllable so that the body and casing together, may be orientated.

The invention applies in particular to an aerospace vehicle of the type described, for example, in application Ser. No. 513,377 of Dec. 13, 1965, now U.S. Pat. No. 3,412,807 in which the mean plane of the extremities of the blades, which are articulated to the hub, may be varied in pitching and rolling planes, additional control being provided in the form of a damping device between each blade and the hub and designed to determine the position of the mean plane of the extremities of the blades at transonic and supersonic speeds.

By way of examples, two forms of an aerospace vehicle according to the invention are described below and illustrated in the accompanying drawings.

Figure 1:
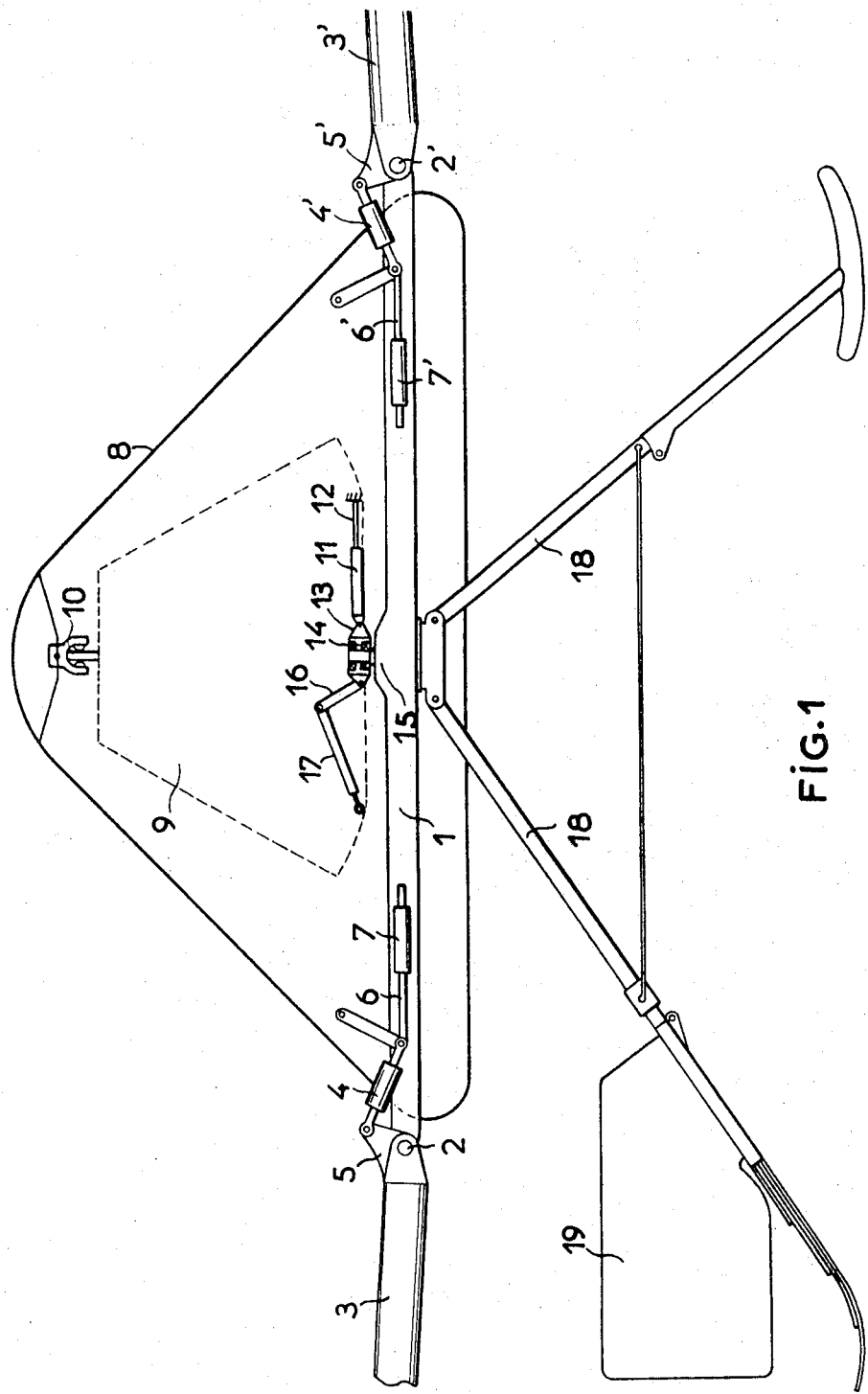
FIG. 1 is a sectional view of one form in which the vehicle is maneuvered by orientating the body in the pitching and rolling planes, in angular relation to the casing which is attached to the rotor hub.

The aerospace vehicle shown in FIG. 1 consists of a hub comprising a circular plate or base to the periphery of which are articulated at 2,2', the blades 3,3' of which there may be any number.

According to French Pat. No. 1,430,178, the blades 3,3' are also joined to the hub by dampers 4,4' and are articulated to levers 5,5' attached to blades 3,3' on the one hand and to rods 6,6' and jacks 7,7' on the other, and which latter are used to fold the blades upwards in space flight. The hub, which forms a circular base 1, is rigidly attached to a casing 8 of substantially conical shape and which contains the body of the vehicle in such a way as to be rotatable relative to the hub.

To this end, the fixed assembly is suspended from the top of the conical casing 8 by means of an angularly universal joint 10 which permits rotation such as a ball point.

The vehicle is maneuvered by varying the plane of the hub and rotor 3,3' assembly in relation to the body 9. For this purpose the body is connected by two control jacks operating at right angles to each other in such a way as to control movement in planes which correspond to the pitching and rolling planes as between the body and the casing. One of these jacks 11 is shown in the drawing: the jack rod 12 is articulated to the body 9, while the jack 11 is articulated to a ring mounted by means of a ball bearing 14 on an axis 15 projecting from the center of the hub base plate 1. An arm 16 is articulated on ring 13 at a point diametrically opposed to jack 11, said arm 16 being articulated on a link 17 which is itself articulated on the body 9. The second control device arranged in a plane perpendicular to that of the drawing comprises members identical to members 11, 12, 16, 17 of the first and connected in the same manner to body 9 and to ring 13. The jack 11 may be operated by a human pilot or remotely controlled by a guidance station on the ground. Thus the jacks acting upon the body have the effect of varying its angular orientation in relation to the casing and the hub, and consequently to the mean plane of the extremities of the blades. This enables the plane of the blades to be adapted to flight conditions at any given moment, in relation to the trajectory.

Preferably, the vehicle is fitted with an extensible skid type undercarriage 18 and a fin 19.

Figure 2:
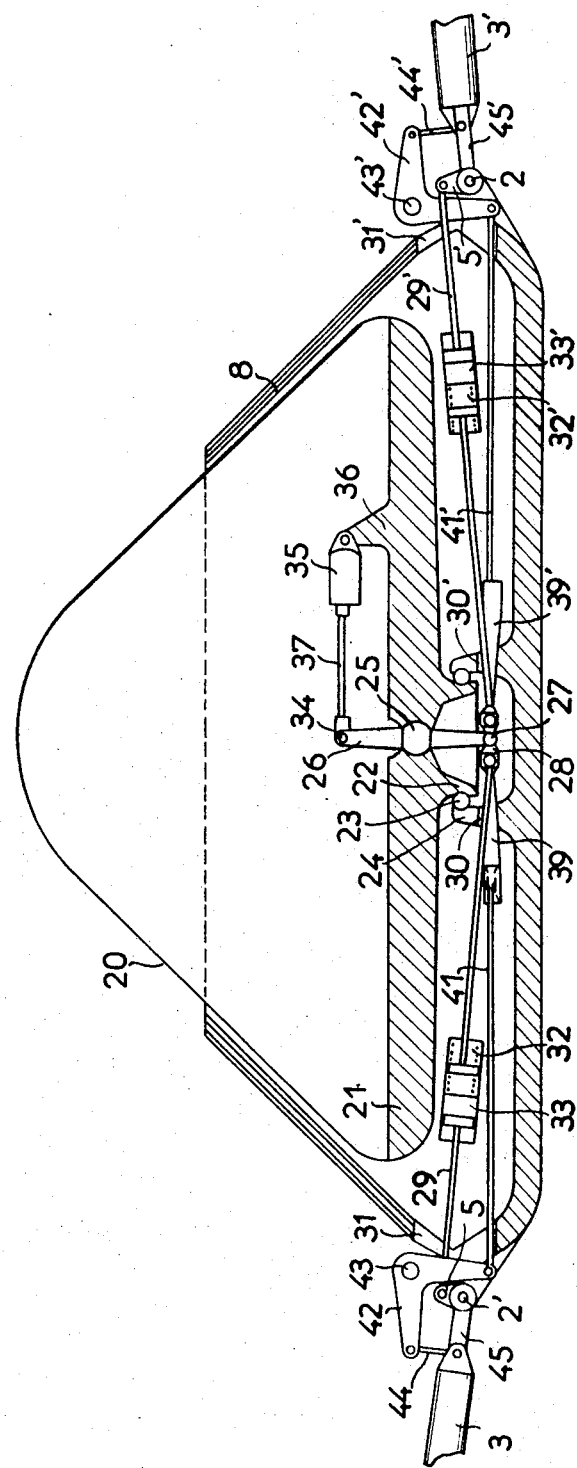
FIG. 2 is a sectional view of a second form of the invention in which the vehicle is maneuvered by varying the mean plane of the extremities of the blades in relation to the body and hub, whose relative position remains unchanged.

In the second form of the invention shown in FIG. 2, the position of the body in relation to the protective casing remains constant and means are provided to vary the plane of the extremities of the blades in relation to the hub and casing and thus to the body.

As in the case of FIG. 1, the vehicle comprises a circular plate or base with blades 3,3' articulated to its periphery at 2,2' and which is rigidly attached to the conical rotating casing 8, which in this particular form is open at the top. As described below, the body is not suspended from the top of the casing in this example.

The nonrotating body 20 is pivoted about the axis of base 1. For this purpose, the body 20 comprises a baseplate 21 on the underside of which is a circular flange or collar 22 which forms the inner race for ball bearings 23, with an outer race constituted by a concentric circular flange 24 fixed to the base 1 of the hub, in such a way that it may rotate with the casing 8 about the body 20.

A control lever 26, moving on a ball joint 25, passes through the center of the base 21 of the body 20. The lower end of this lever 26 engages in a ball joint 27 at the center of a ball bearing 28 to the outer ring of which are pivoted rods 29,29' connected to levers 5,5' which are fixed to blades 3,3', these rods passing through openings 30,30' in collar 24 of hub 1 and through openings 31,31' in the rotating casing 8. Dampers, preferably of the compound type, consisting of springs 32,32' in conjunction with dashpots 33,33' as described in French Pat. No. 1,430,178, are fitted to rods 29,29' in order to stabilize the mean plane of the extremities of the blades at supersonic and transonic speeds.

The control lever 26 is actuated by two jacks acting at right angles to each other and connected to it by a ball joint 34. As illustrated, each one of these jacks comprises a cylinder 35 universally articulated to a bracket 36 fixed to the base 21 of the body 20 and a rod 37 acts upon the ball joint 34. In this way, these two jacks enable the position of the mean plane of the extremities of the blades 3,3' to be varied in two planes at right angles and thus control the vehicle during reentry into the atmosphere and for landing.

Figure 3:
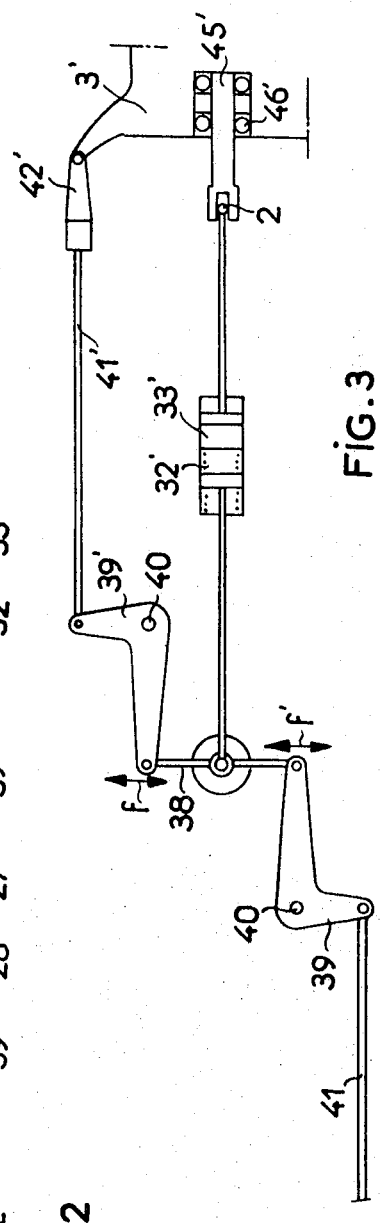
FIG. 3 shows the cyclic pitch control system of the rotor blades as applied to this form of the invention illustrated in FIG. 2.

Also illustrated in FIGS. 2 and 3 is the system which is used, in this form of the invention, for controlling the cyclic pitch of the blades. This system comprises a rocking lever 38 mounted on the bearing 28, the position of which is controlled by lever 26. This rocking lever actuates two cranks 39,39' pivoted about axes 40,40' fixed perpendicularly to hub 1 and which in turn actuate rods 41,41' connected to cranks 42,42' pivoted about axes 43,43' also fixed to hub 1 but parallel to its plane and connected by rods 44,44' to blades 3,3' which are pivoted about their longitudinal axes 45,45' on bearings 46,46'. Thus when the control lever 26 is inclined in relation to hub 1, the rocking lever 38 oscillates in the direction of arrows f,f' as the hub rotates and actuates cranks 39,39' which, through rods 41,41', levers 42,42' and connecting rods 44,44', cause the blades 3,3' to oscillate about their longitudinal axes 45,45' at the frequency of rotation of hub 1.

The rotating protective casing effectively protects the body against heat. This protection is increased at the moment of reentry into the atmosphere by the fact that, at that moment, the plane of the extremities of the blades is inclined in relation to the trajectory of the vehicle in order to obtain the maximum braking effect and the body is thus situated behind the base 1 which forms the rotating hub of the vehicle.

I claim:

1. An aerospace vehicle comprising a body, a casing protectively surrounding said body to provide protection against heat, said casing comprising a circular base plate forming the hub of a rotor having autogyrational blades attached to said base plate, means for rotatably connecting said body with said casing and means for controlling the mean position of the plane containing the tips of said blades with respect to said body.

2. An aerospace vehicle according to claim 1, wherein the casing has a generally conical shape, the body being attached to the upper part of said casing by bearing means permitting angular orientation and rotation relatively between body and casing, and control means being connected to said body and to the base plate of the casing respectively for controlling said angular orientation.

3. An aerospace vehicle according to claim 2, wherein said control means comprise at least two controllable jacks having each two relatively movable members, arranged at right angles respectively and transversely to the axis of the base plate, and having each one of said members attached to the body and the second member articulately and rotatably connected to the base plate.

4. An aerospace vehicle according to claim 3, wherein the base plate is provided with a central axis projecting perpendicularly to its inner surface, a circular ring rotatably mounted on said axis, said second members of said jacks being articulated on said ring and an articulated linkage being mounted in a radial plane opposite to each jack between the body and said ring.

5. An aerospace vehicle according to claim 1, wherein the autogyrational blades are articulately attached to the base plate of the casing and wherein control means are provided for cyclically varying the pitch of said blades.

6. Vehicle according to claim 1, further comprising:
   a central collar bearing supporting the body of the vehicle on the said base for relative rotation;
   a control lever mounted for angular universal movement on the body and extending axially through the said bearing, a second bearing situated concentrically with bearing with which the extremity of the said lever engages;
   two jacks mounted at right angles to each other on the body of the vehicle to control angular movements of the said lever on two axes, control rods articulated respectively to the second of the said bearing and to the blades in such a way as to control the position of these latter; and
   a system of dampers on these control rods.

7. Vehicle according to claim 6, further comprising:
   a bearing element rigidly mounted on the underside of said body;
   a complementary bearing element upstanding from said base, the bearing so constituted being open centered for the passage of said control lever; and
   the complementary bearing element defining:
      radial openings for the passage of said control rods and surrounding said second bearing; and
      a ball joint connectively between the bottom end of said control lever and said second bearing.

8. Vehicle according to claim 7, further comprising rocking levers linked to said control lever through said second bearing and connected by rods to further rocking levers so as to controllably connect said control lever to the rotor blades to cause cyclic pitch variation thereof.